Nov. 3, 1953  R. FILLIETTE  2,658,126
MEANS FOR ADJUSTING THERMOSTATIC RELAYS
Filed June 17, 1952  2 Sheets-Sheet 1
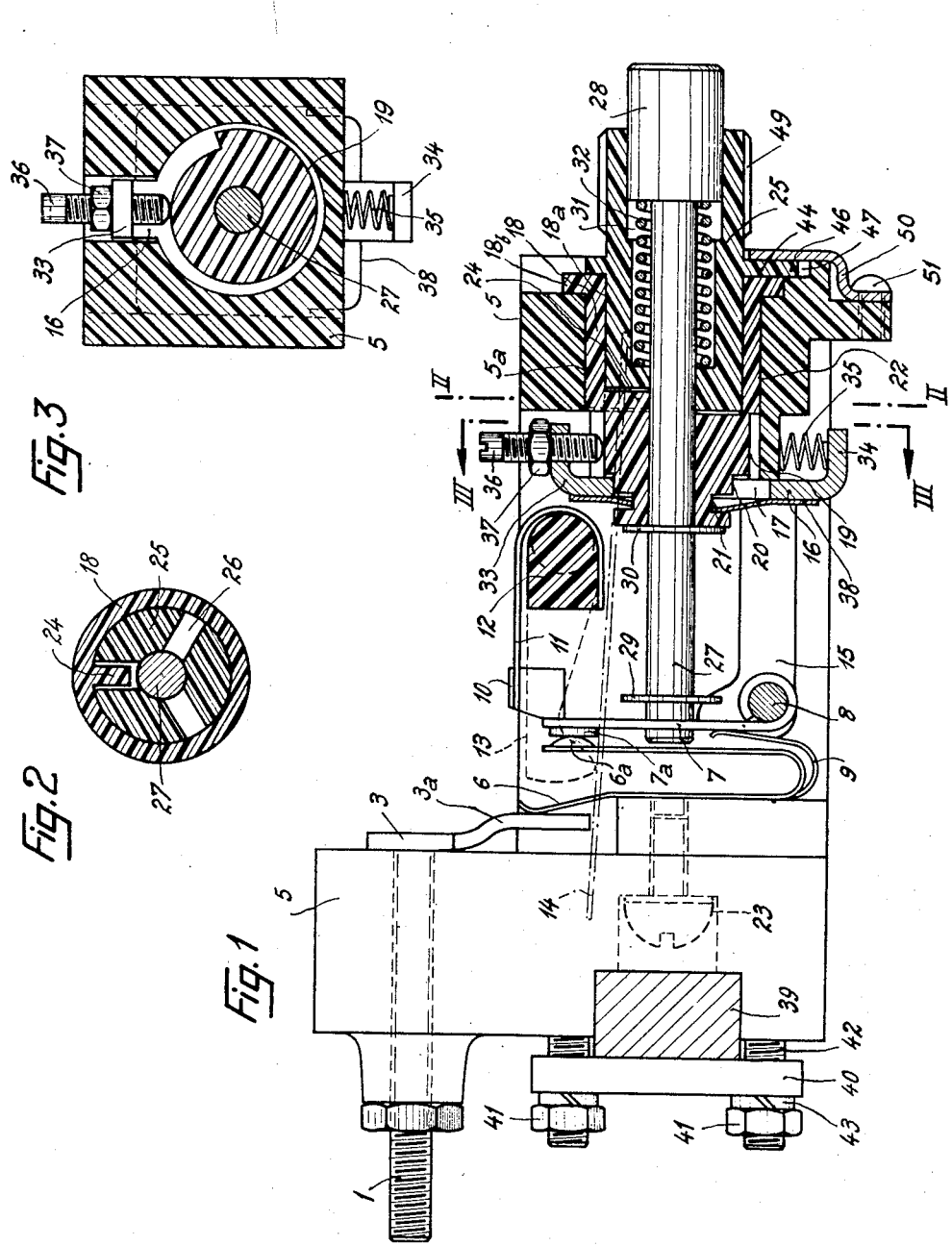

Nov. 3, 1953 R. FILLIETTE 2,658,126
MEANS FOR ADJUSTING THERMOSTATIC RELAYS
Filed June 17, 1952 2 Sheets-Sheet 2
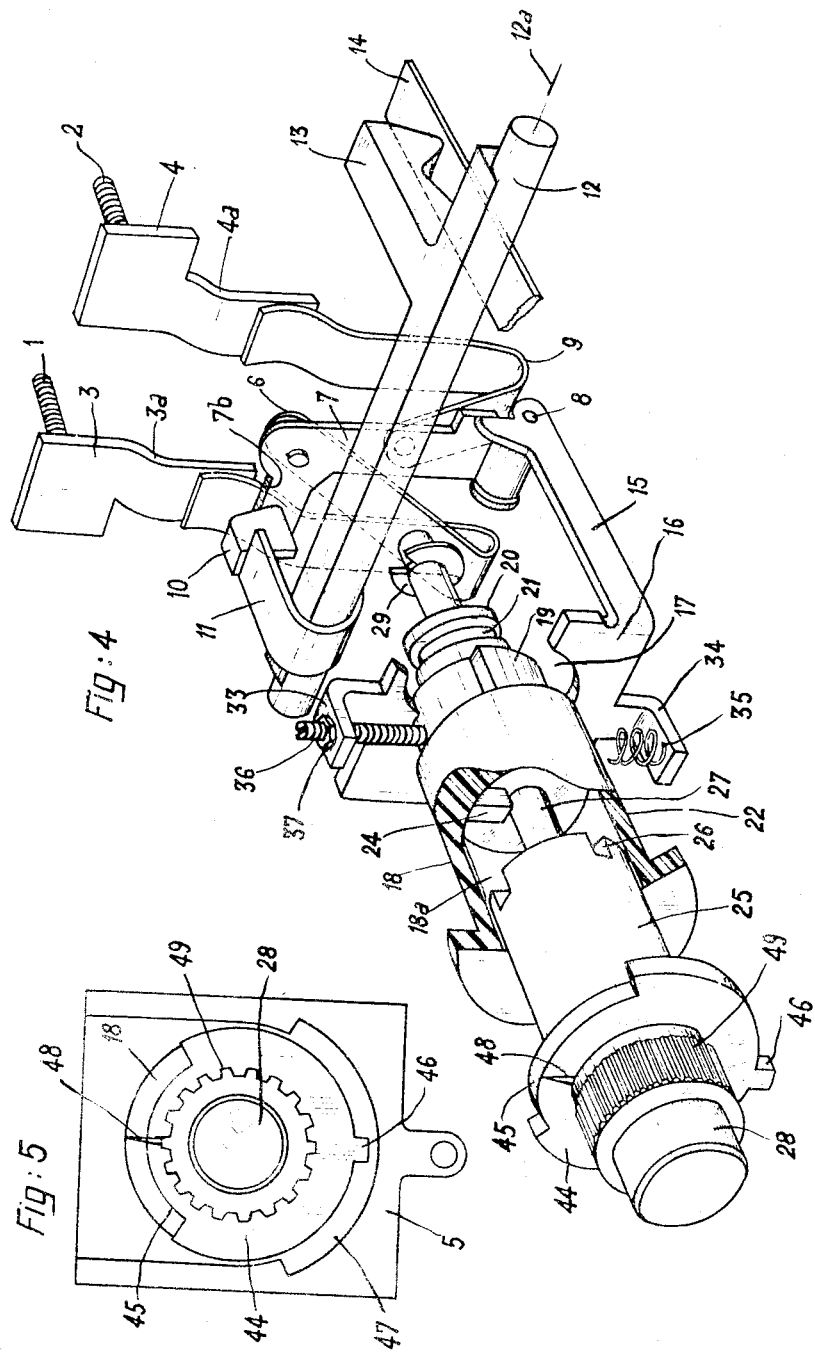
Raymond Filliette
By Fraser, Myers & Manley
Attys.

Patented Nov. 3, 1953

2,658,126

UNITED STATES PATENT OFFICE 2,658,126

MEANS FOR ADJUSTING THERMOSTATIC RELAYS

Raymond Filliette, Rueil-Malmaison, France, assignor to La Télémécanique Electrique (Société Anonyme), Seine, France, a French company Application June 17, 1952, Serial No. 294,087

Claims priority, application France August 31, 1951

16 Claims. (Cl. 200—116)

Thermostatic relays are generally capable of a certain amount of adjustment by which the user is able to adapt the relay accurately to the required operational characteristics and also the designer is enabled to produce a limited number of different designs of relays, to cover a large range of possible characteristics.

For the latter reason, the usual ranges of adjustment are in practice too extensive for the users' requirements, which may lead to errors in adjustment. The ratio of the minimum value to the maximum value for the tripping current is, for example, of the order of from 1 to 1.16 while a ratio of the order of from 1 to 1.25, for example, would be entirely satisfactory. The problem therefore arises of considerably reducing the ranges of adjustment. However, such a reduction would result in a corresponding increase in the number of designs of relays necessary to cover the whole range of tripping currents.

The present invention relates to an improved means for the adjustment of thermostatic relays, by which it is possible to maintain a relatively large range of adjustment while only allowing a much reduced margin of adjustment in the use of the relay. This improvement consists in subdividing a total possible displacement of the movable parts of an adjusting device, by means of stops, into a number of partial displacements each corresponding to an adjustment range, the change from one range to another being effected by a different operation than that by which the adjustment within the required range is effected.

Preferably, an adjustable member capable only of a limited displacement is adapted to be coupled in various positions with the adjusting device so that the choice of the adjustment range is determined by the position of the coupling, while the extent of the range is determined by the amplitude of the displacement of the adjustable member.

In particular, in one embodiment of the invention, a thermostatic relay is provided with a rotary adjustable member adapted to be coupled with a transmission member of the adjusting device, which is also adapted for rotation, in a predetermined number of relative angular positions, for example three positions 120° apart, the angular displacement of the whole assembly then being limited by stops associated with the said adjustable member.

The relay may be of the known type in which the adjustment of operation is effected by varying the point at which a lever forming a stop engages with a movable contact urged in the opposite direction to the said stop by a spring force at opening or at closing of the relay. The said lever is associated with one or more bimetallic strips so as to free the said movable contact by its movement when the said bimetallic strip or strips are sufficiently deformed, that is to say, when a sufficient current flows therethrough. In this type of relay according to the invention, the movable contact is mounted on a support adapted to effect translational movement with respect to the said lever under the action of a cam actuated by the adjustable member so that operation of the latter causes the translational movement of the support and consequently a variation of the said point of engagement of the lever with the contact.

The invention will now be described with reference to the accompanying drawings, which are given by way of example, and in which:

Figure 1 is a longitudinal section through a thermostatic relay, according to the invention showing parts for the control and adjustment thereof.

Figures 2 and 3 are sections on the lines II—II and III—III respectively of Figure 1, the insulating casing of the relay being omitted in Figure 2.

Figure 4 is a view in perspective, partly broken away, of the relay, the casing being removed, and Figure 5 is a front elevation of the relay.

The relay illustrated in the drawings comprises current input and output terminals 1 and 2 formed by rods extending through an insulating support or housing 5. The said rods are connected to conductor plates 3 and 4 respectively, which are provided with extensions 3a and 4a. The extension 3a is in permanent contact with a resilient metal blade 6 having at its free end a contact stud 6a adapted to engage a second contact formed by a stud 7a situated at the end of a lever 7 pivoted upon a pin 8. The said lever is subjected to the action of a spring blade 9 tending to move it away from the strip 6 and thus break the contact between studs 6a and 7a. The said spring 9 makes contact with the plate 4a and forms the electrical connection between the terminal 2 and the stud 7a. The two spring blades 6 and 9 are secured to the housing 5 by screws 23.

In the position illustrated in the drawings, the contact is closed. Breaking of the contact by pivoting of the lever 7 about the pin 8 under the action of the spring 9 is prevented by a stop 10 bearing against a finger 7b secured to the lever 7. The stop 10 is rigidly connected by a support or locking lever 11 to a shaft 12 adapted to pivot about its axis 12a, the said shaft having secured thereto one or more levers 13 each co-operating with a bimetallic strip 14 through which the current to be controlled flows.

The pin 8 is mounted on an arm 15 secured to a plate 16 having at its centre an aperture 17 through which the end 20 of a cylindrical casing 18 of insulating material freely passes, the said end being formed with an annular groove 21.

The cylindrical part 22 of the casing 18 is so engaged as to be able to turn without substantial play in a bearing 5a of the housing 5. The casing 18 includes between its two cylindrical parts 20 and 22 a portion 19 of spiral section to provide an inclined bearing surface.

The plate 16 is urged against the end of the bearing 5a by a resilient plate 28 engaged in the groove 21 in the casing 18, which in turn bears against the housing 5 by its shoulder 18b. In addition, the lateral edges of the said plate can slide against the inner faces of the housing 5 (Figure 3) and the plate 16 and the members mounted thereon are capable of effecting vertical sliding movement relative to the housing 5 and to the casing 18. Moreover, the plate 16 comprises two right-angled extensions 33 and 34 diametrally opposed with respect to the casing 18 and situated longitudinally thereof to correspond with the spiral bearing surface 19. Mounted between the extension 34 and the lower part of the bearing 5a is a spring 35 which tends to move the plate 16 downwardly. This movement is counteracted by a screw 36 extending through a threaded hole in the extension 33, the end of which screw rests on the surface 9 through an aperture in the bearing 5a, and is locked by a lock nut 37.

The casing 18 comprises a cylindrical cavity 18a, at the closed end of which a radial stud 24 projects. A cylindrical member 25, in one end of which three radial notches 26 are formed 120° apart, with a width slightly larger than that of the stud 24, is arranged to slide in the cavity 18a. The said member also has a shoulder 44 at its other end provided at its lower part with a stud 46 adapted to engage in a recess 47 in the form of a sector of about 120° formed in the body of the housing 5. The member 25 has a knurled portion 49 intended to facilitate the operation thereof as will be hereafter described. A plate 50 secured to the housing 5 by screws 51 closes the recess 47 and maintains the member 25 engaged in the casing 18.

The relative angular position of the member 25 and of the casing 18 can be observed by means of the recess 45 through which the shoulder 18b of the casing 18 is visible. Moreover, the member 25 may carry a finger or pointer 48 movable relative to a scale on the front face of the housing 5.

A rod 27 having secured at one end a button 28 extends through the member 25 and the casing 18 and is supported and guided by the said member and casing in such manner as to be free to slide with respect thereto, the other or inner end being adapted to engage the strip 6. A stop ring 29 secured adjacent the inner ends permits the rod 27 to act also on the lever 7 against the action of the spring 9. The movement of the rod 27 is limited, in one direction, by a ring 30 adapted to abut against the end of the cylindrical part 20 and of the casing 18, in the other direction by a shoulder 31 on the interior of the member 25. A spring 32 disposed within the member 25 and surrounding the rod 27 abuts at one end against the closed end of the said member and at the other end against the button 28 thus maintaining the rod in the position illustrated in Figure 1.

The whole relay is secured on a bar 39 by means of a strap 40 and of two nuts 41 screwed on to threaded rods 42 secured to the housing 5 and locked by means of spring washers 43.

The arrangement hereinbefore described operates in the following manner:

In the position illustrated in Figure 1, the relay is operated, the studs 6a and 7a being in contact. The external electrical circuit is completed through the terminal 1, the plate 3, the blade 6, studs 6a and 7a, the lever 7, the blade 9, the plate 4 and the terminal 2. The blade 9 tends to move the stud 7a away from the stud 6a, but this is prevented by the stop 10.

When a predetermined current flows through the bimetallic strip 14, the strip is deformed so that the free end of the lever 13 secured to the shaft 12 is raised and consequently the shaft rotates and raises the lever 11 on which the stop 10 is mounted. The movable contact 7a is then free to move backwardly under the action of the spring blade 9, whereby the circuit is broken.

When the bimetallic strip cools, the lever 11 falls back and again abuts against the upper edge of the lever 7. In order to re-set the relay, it is sufficient to depress the button 28. The inner end of the rod 27 then engages the blade 6 and urges it forwardly, while the ring 29 engages the lever 7, the upper edge of which is thus moved forwardly beyond the stop 10, whereupon the said stop is enabled to move downwardly behind the said lever, thus locking the latter in the position illustrated in Figure 1. On release of the button 28, the blade 6, by its resilience restores the contact and ensures the necessary contact pressure. It is to be noted that, in order momentarily to interrupt the current in the extreme circuit, it is sufficient the push the button 28 so as to move the blade 6 away from the lever 7, the latter being held in position by the spring blade 9. Thus, the button 28 serves to reset the relay and also to break the circuit established by the relay.

It is obvious that the value of the tripping current depends upon the point of engagement of the stop 10 with the lever 7, that is to say, upon the distance between the lower edge of the stop 10 and the upper edge of the lever 7. As this distance increases, the deformation of the bimetallic strip necessary for ensuring the tripping, and consequently the strength of the current flowing through the said bimetallic strip must also increase. In order to regulate the tripping current, it is therefore sufficient to adjust the said distance of the point of engagement from the top of lever 7.

This adjustment is effected by vertically displacing the plate 16 supporting the lever 7. Such displacement may be effected either by adjustment of the screw 36, the point of which bears against the inclined bearing surface 19, or by the rotation of the casing 18 to move the inclined surface 19 relative to the screw 36. The first mentioned adjustment permits of calibrating the relay, while the second provides a means for adjusting the relay. Rotation of the casing 18 is effected through rotation of the member 25, the latter being releasably secured to the casing 18 through one of the notches 26 in engagement with the stud 24. The maximum amplitude of the movement of the plate 16 is obviously obtained by rotating the casing 18 through one complete revolution which corresponds to a maximum range of adjustment of the order of 360°.

However, owing to the fact that the stud 46 secured to the member 25 can only move in the sector 47 of 120°, only a corresponding rotation of the casing 18 is possible, that is to say, a range of adjustment of the order of one third of the maximum range.

In order to change from one range of adjustment to another it is preferable to detach the plate 50 by slackening the screw 51, and then to pull the member 25 outwardly against the action of the spring 32 so as to disengage the notch 26 from the stud 24, as shown in Figure 4. The member 25 is then turned through 120° in the desired direction, so as to bring a further notch 26 opposite the stud 24. The member 25 is then released and engages with the stud 24, after which the member 25 together with the casing 18 is brought into a position in which the stud 46 is engaged in the sector 47. The plate 50 is then re-fitted. For the calibration of the relay, the casing 18 being in a pre-determined angular position, a given current is passed through the bimetallic strip 14 and the screw 36 is so adjusted that tripping occurs. The position of the screw is then fixed by the lock nut 37 and the upper part of the said screw can then be cut to prevent any subsequent alteration of the setting. It is thus possible to compensate initially for manufacturing tolerances in the different parts of the relay.

The active face of the stop 10 is preferably in the form of an arc of a circle having a radius equal to its distance from the axis of rotation 12a of the shaft 12, so that the contact between the stop 10 and the lever 7 is always a point contact.

It will be understood that modifications may be made in the construction hereinbefore described, by substitution of equivalent technical means, without departing from the scope of the present invention.

What I claim is:

1. In a relay of the type described having contact means trippable between two conditions in response to a predetermined value assumed by a controlling factor, adjusting means displaceable over a comparatively wide range for correspondingly varying the value of said factor to which the contact means will respond, stop means for preventing effective displacement of the adjusting means except in a selected one of a number of relatively narrow ranges included within said wide range, and range-selecting means for selecting the narrow range in which said adjusting means is effectively displaceable.

2. A relay as claimed in claim 1, wherein said controlling factor is the flow of current through a deformable heat-responsive element.

3. A relay as claimed in claim 2 wherein said element comprises a bi-metallic strip.

4. A relay as claimed in claim 1, wherein said adjusting means comprises contact carrying means displaceable with respect to a support to correspondingly vary said response value, a first rotary member rotatable over a relatively wide angular range with respect to a support and drivingly associated with said contact carrying means, a second rotary member rotatable with respect to said support and to said first member, cooperating stop means on said support and on said second member adapted to limit the relative displacement therebetween to an angular range substantially narrower than said wide angular range, and cooperating means on said first and second member for connecting both members in rotation in any selected one of a number of different relative angular positions.

5. A relay as claimed in claim 1, wherein said adjusting means comprises contact carrying means displaceable with respect to a support to correspondingly vary said response value, a first rotary member rotatable over a relatively wide angular range with respect to a support and drivingly associated with said contact carrying means, a second rotary member rotatable with respect to said support and to said first member, cooperating stop means on the support and the second member adapted to limit the relative displacement therebetween to an angular range substantially equal to said wide range divided by an integral number, and cooperating notch and projecting means on said members for locking both members for bodily rotation in any selected one of a number, equal to said integral number, of relative angular positions.

6. In a tripping relay having a pair of contacts adapted to assume predetermined relative conditions, means deformable in response to current flow, movement transmitting means from the deformable means to a movable one of said contacts for tripping said contacts from one to the other condition after a predetermined amount of deformation of the deformable means has occurred, adjusting means displaceable over a relatively wide range for correspondingly varying the amount of deformation of the deformable means necessary to trip the contacts, means for preventing effective displacement of the adjusting means except in a selected one of a number of relatively narrow ranges included within said wide range, and adjustment range selecting means for selecting the narrow range in which said adjusting means is effectively displaceable.

7. A relay as claimed in claim 6, wherein said deformable means comprises bi-metal strip means.

8. A relay as claimed in claim 6, which comprises biassing means urging said one contact to one position, a member normally restraining said one contact in another position against the force of said biassing means and operated from said deformable means in response to said predetermined deformation thereof to release said one contact for movement by its biassing means to its first-mentioned position, and means operated by displacement of said adjusting means to alter the relative position between said member and said one contact in a direction to alter the amount of deformation necessary to operate said member for releasing said one contact.

9. A relay as claimed in claim 6, which comprises spring means urging said one contact to one position, a member rockable about an axis in response to deformations of the deformable means and having a part normally restraining said one contact in another position thereof against the force of said spring means, said member when rocked a predetermined angle being adapted to release said one contact for movement by its spring means, and means operated by displacement of said adjusting means to alter the relative position between said member and said one contact in a direction to alter the angle by which said member must be rocked for releasing said one contact.

10. A relay as claimed in claim 6, which comprises spring means urging said one contact to one position, a member rockable about an axis in response to deformations of the deformable means and having a part-circular abutting surface coaxial with said axis normally in tangential engagement with a surface of said one contact for restraining said one contact in another position thereof against the force of said spring means, said member when rocked a predetermined angle being adapted to release said one contact for movement by its spring means, and means operated by the adjusting means for altering the relative position between said one contact and said member in a direction normal to said axis to alter the angle by which said member must be rocked for releasing said contact.

11. A relay as claimed in claim 6, which comprises spring means urging said one contact to one position, a member rockable about an axis in response to deformations of the deformable means and having a part normally restraining said one contact in another position thereof, said member when rocked a predetermined angle being adapted to release said one contact for movement by its spring means, means supporting said one contact for displacement relative to said member in a direction normal to said axis to alter said predetermined angle, and means operated by displacement of said adjusting means for displacing said supporting means.

12. A relay as claimed in claim 11 wherein the means operated by displacement of the adjusting means comprise a cam.

13. A relay as claimed in claim 6, which comprises spring means urging said one contact to one position, a member rockable about an axis in response to deformations of the deformable means and having a part normally restraining said one contact in another position, said member when rocked a predetermined angle being adapted to release said one contact for movement by its springs means, a support mounting said one contact and displaceable relative to said member in a direction normal to said axis for altering said predetermined angle, a cam rotatable on displacement of the adjusting means, and means adjustably secured to said support and engaging the cam for displacement of the support upon rotation of the cam, adjustment of said cam-engaging means serving to pre-set a reference position of said support with respect to said member.

14. A relay as claimed in claim 13, wherein said cam-engaging means comprise a screw adjustable with respect to said support and having an end engaging the cam, and spring means acting on the support to urge said screw into engagement with the cam.

15. In a relay of the type described having contact means trippable between two conditions in response to a predetermined value of a controlling factor, a first rotary member movable with respect to a support over a relatively wide range for correspondingly varying the value of said factor to which the contact means will respond, a second rotary member movable with respect to said support and to the first member, cooperating stop means on the support and the second member adapted to limit the relative displacement therebetween to an angular range substantially narrower than said wide range, and cooperating means on said members for locking both members in rotation in any selected one of a number of different relative angular positions.

16. In a relay of the type described having a pair of contacts adapted to assume different relative conditions, means deformable in response to current flow, movement transmitting means from the deformable means to at least one movable one of said contacts for tripping said contacts from one to the other condition after a predetermined amount of deformation of the deformable means has occurred, a first rotary member rotatable with respect to a support over a relatively wide range for correspondingly varying the amount of deformation of the deformable means necessary to trip the contacts, a second rotary member movable with respect to said support and to said first member, cooperating stop means on the support and the second member adapted to limit the relative displacement therebetween to an angular range substantially narrower than said wide range, and cooperating means on said members for locking both members in rotation in any selected one of a number of relative angular positions.

RAYMOND FILLIETTE.

References Cited in the file of this patent
UNITED STATES PATENTS

| Number | Name | Date |
|---|---|---|
| 2,214,695 | Jennings | Sept. 10, 1940 |
| 2,388,617 | Link | Nov. 6, 1945 |
| 2,388,620 | Runke | Nov. 6, 1945 |
| 2,526,861 | Getchell | Oct. 24, 1950 |